April 13, 1965     B. PRÖBSTING     3,177,911
RETRACTABLE ENSILAGE CUTTER
Filed May 1, 1963     2 Sheets-Sheet 1
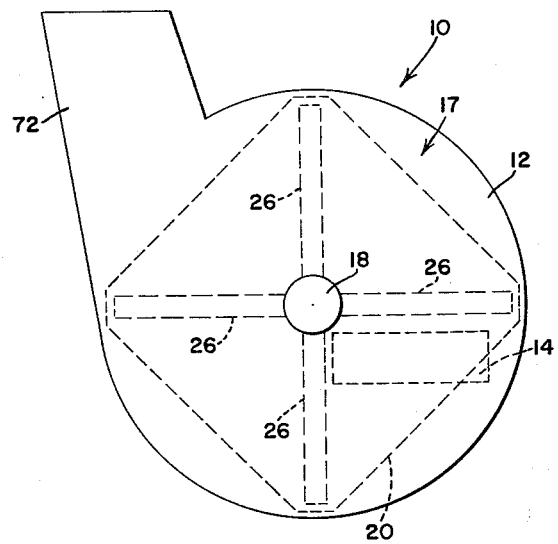
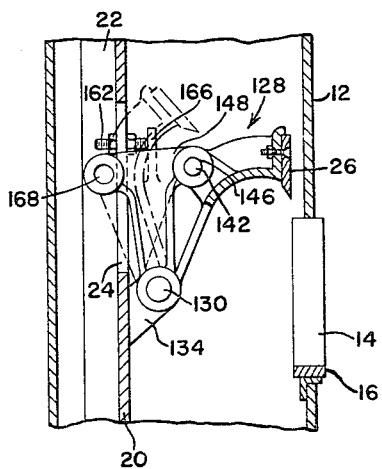
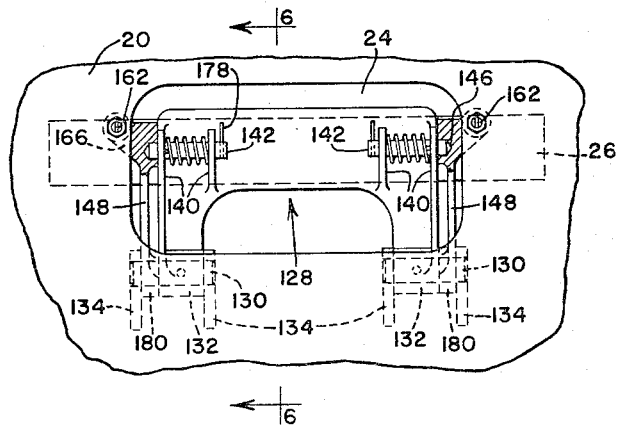
INVENTOR.
BERNHARD PRÖBSTING
BY *John C. Thompson*
ATTORNEY April 13, 1965   B. PRÖBSTING   3,177,911
RETRACTABLE ENSILAGE CUTTER
Filed May 1, 1963   2 Sheets-Sheet 2
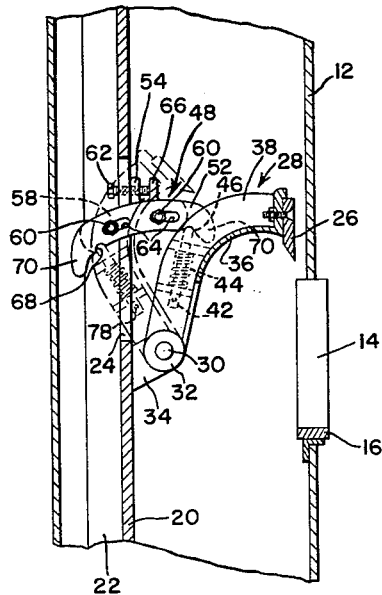
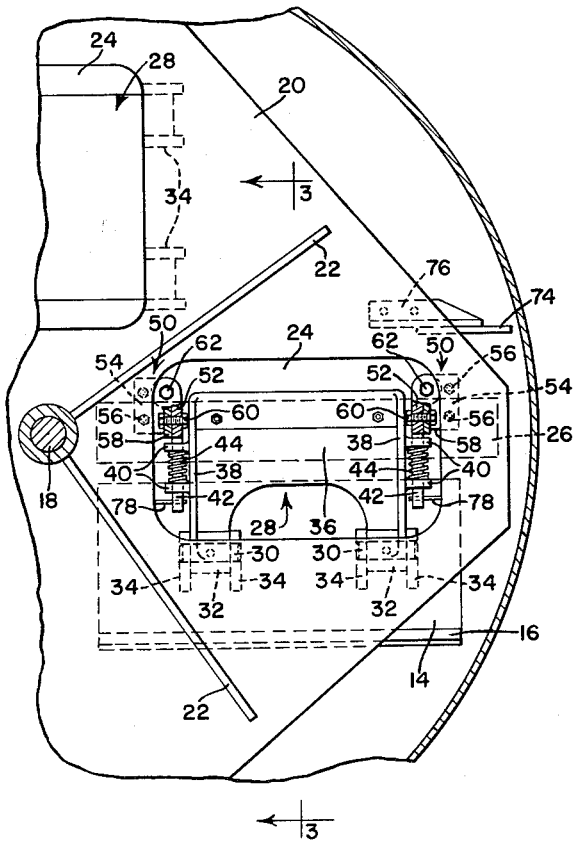
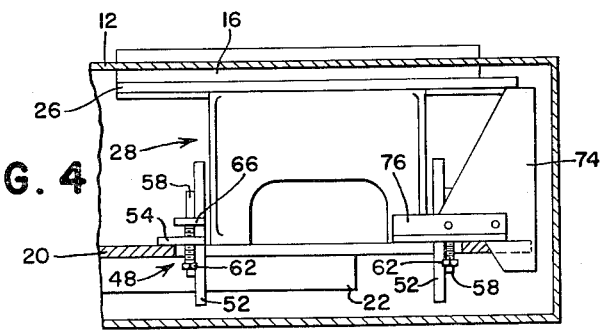
INVENTOR.
BERNHARD PRÖBSTING
BY
ATTORNEY United States Patent Office 3,177,911
Patented Apr. 13, 1965

3,177,911
RETRACTABLE ENSILAGE CUTTER
Bernhard Pröbsting, Mannheim-Almenhof, Germany, assignor to Deere & Company, Moline, Ill., a corporation of Delaware
Filed May 1, 1963, Ser. No. 277,362
Claims priority, application Germany, May 22, 1962,
D 38,970
12 Claims. (Cl. 146—107)

The present invention relates generally to forage cutters, and more particularly to disk wheel forage cutters, and solves the problem of simplifying the varying of the forage length through a simplified knife mounting means whereby the knives can easily be moved between engaging and disengaging positions.

In order to obtain forage of approximately the same length, disk wheel forage cutters are preferably used which may be equipped with one to six knives. In order to be able to produce different lengths of forage as needed, the number of knives is preferably changed. The disk wheel forage cutters of the prior art include a cutter-blower having a rotatable disk wheel on which are fastened, besides throwing blades, several knife mountings by means of screw connections. On each knife mounting is arranged a detachable knife. If, for example, the number of knives is to be reduced, that is if forage material is to be cut longer, then the knife mountings which are no longer needed, plus their knives, are removed by loosening the screw connections. Aside from the fact that the mountings plus knives must be stored as loose parts, the assembling is difficult and also endangers the cutting edges of the knives. Moreover, the cutting edges of the knives, fastened to the heavy mountings, are easily damaged during the storage.

Therefore, it is an object of the present invention to overcome the disadvantages of the prior art construction. More particularly, it is an object of the present invention to provide a forage cutter in which the knives are arranged to be shifted between a cutting position and a disengaged position. In this way the handling of the knives as they are engaged or disengaged for the purpose of changing the forage length is first of all simplified so that a quick change in the cutting succession is possible. Furthermore the heavy mountings with the sharp knives can be easily and safely changed. The large expenditure of force required in dismantling the usually rusted screw connections, as well as injuries to the knife edges, are also eliminated through this invention. It is another object of this invention to keep the disk wheel in balance as the number of cutting knives is varied. This is achieved in the present invention by retaining the knives and their associated mounting structure and shifting them between engaged and disengaged positions. By this construction expensive counterweights, which would be necessary when using removable knives, are therefore not required.

It is another object of the present invention to provide knife mounting means for a disk wheel forage cutter in which the knife mounting means are provided with an overload safety mechanism. For example, if hard objects enter into the cutter-chamber with the harvested material, then the knives can deflect individually, without any one part being damaged. By employing such an overload safety mechanism the knife edges will remain intact. Moreover the complete rotor drive, plus bearing, is protected against shocks which would otherwise result when the knives hit hard objects. More specifically, it is a feature of the present invention to provide a locking means which can serve as an overload safety mechanism. If the knives in working position hit hard objects during the forage cutting, then they can be deflected individually through the overload safety mechanism, that is, the locking means automatically comes out of the region of the corresponding recess and thereafter snaps into a second recess.

According to the invention selected knives can be disengaged from their cutting positions by changing their distance from the shear bar along lines parallel, or approximately parallel, to the axis of rotation of the rotor. Thus the disengaged knives leave sufficient room for the harvested material to flow through the inlet opening and be cut off by the next knife in its engaged position.

The invention furthermore provides that the knives can be arranged so that they can be disengaged together with their knife mountings at the rotor or disk. In order to achieve this the knife mounting can be arranged so that it can move into a recess provided at the rotor when the knife is disengaged. This has the advantage that the knife mounting is retracted from the flow-through region of the forage material.

As far as the detailed arrangement of the knife mountings is otherwise concerned, the invention provides that the knives can be disengaged by swinging the knife mountings about an axis running parallel or approximately parallel to the long axis of the knives, or be swung back into the working position. In this way the knives are brought out of or into the working position quickly and effortlessly. It is a further object of this invention to provide a structure for locking the knives or the knife mountings in either their engaged or disengaged position. In this way the knife or the knife mounting can always be held securely in the chosen position. More specifically, it is an object of the present invention to provide at least one locking bolt on the knife mounting, in which the locking bolt can engage in recesses provided in an associated latching means.

A further object of the present invention is to provide means for adjustably positioning the knives with respect to the shear bar. More specifically it is an object of the present invention to provide an adjusting screw or bolt which can be mounted to cooperate with a portion of the knife mounting means whereby the knife can be adjustably positioned with respect to the shear bar.

These and other objects of the present invention will be apparent to those skilled in the art after a consideration of the following detailed description, taken in conjunction with the accompanying drawings, in which:

FIG. 1 is a view of the cutter-blower of a disk wheel forage cutter in diagrammatic representation.

FIG. 2 is a view somewhat similar to FIG. 1 showing one embodiment of the invention.

FIG. 3 is a section through the device of FIG. 2 along the lines 3—3.

FIG. 4 is a somewhat schematic plan view of the device illustrated in FIG. 2.

FIG. 5 is a view corresponding generally to FIG. 2 illustrating an alternative embodiment of the present invention, and FIG. 6 is a view along the lines 6—6 in FIG. 5.

In the drawings, the housing of the cutter-blower of a disk wheel forage cutter is designated by 10 and has a front wall 12 provided with an inlet opening 14 along one edge of which is a shear bar 16. The opening 14 is located below the horizontal and next to the vertical center line of the cutter-blower and is preferably of a horizontal rectangular form. The cutter-blower, indicated generally at 17, is mounted about a drive shaft 18 (which is rotated in a conventional manner), and includes a driven disk wheel 20, which may be approximately square. For the sake of better rigidity, one side of the disk wheel 20 is provided with flanges 22 which extend radially from the hub or shaft 18, these flanges being arranged at approximately right angles to each other. A rectangular opening 24 is formed in the disk wheel 20 between each adjacent pair of flanges, and the mounting means for knives 26 are adapted to cooperate with the openings 24 in the manner fully set forth below.

In the embodiment illustrated in FIGS. 2–4, the knife mounting means, designated 28, includes an overload safety mechanism. As can be seen from FIG. 2, the knife 26 covers the opening 24 in the long direction. While generally four knives are employed which may be arranged according to FIG. 1 on the disk wheel 20, it is also possible to arrange more or fewer knives 26 on the disk wheel 20. However, if only one knife is employed, a counterweight, such as a specially fashioned throwing blade (not shown) must be present. In the following description only one knife 26 plus its mounting will be discussed for the sake of simplicity. The knife 26 is fastened adjustably on a knife mounting 28 with its cutting edge directed downwardly in the direction of rotation and extending almost over the entire radius of the cutter-blower 17. The knife mounting 28 itself is swingably mounted on pivots 30 in bearings 32 on supports 34 on the disk 20, the mounting consisting essentially of a flat, curved part 36 with two ribs 38 arranged on it at right angles. Each of the ribs is provided with a pair of apertured lugs 40, and an axially displacing locking pin or detent 42 is disposed in the alined apertures in the lugs. A compression spring 44 is disposed about the pin 42 and one end is held in compression against one of the lugs 40 while the other end of the spring is secured in a conventional manner to the pin 42. When the knife 26 is in its normal working position a rounded end of the pin 42 is held by spring pressure in a corresponding recess 46 of means 48 which locking includes first bracket means 50 (FIG. 2) which shiftably carries second bracket means or segment 52. The first bracket means or guide piece includes a first portion 54 secured to the front of the disk wheel 20 as by rivets or other fastening means 56, and a transversely extending portion 58 which carries bolts 60. The first portion 54 is provided with a threaded aperture through which an adjusting screw 62 is threaded. The shiftable segment 52 is provided with slots 64 through which the bolts 60 pass. Extending upwardly from the segment is an abutment 66 that cooperates with one end of the adjusting screw 62. The segment 52 is also provided with two recesses 46 and 68 to receive the detent 42, and disposed at either end of the segment are stops 70 which limit the movement of the knife mounting means 28.

The operation of the device according to the invention is as follows:

The long-fibered forage material conveyed by the conveyor (not shown) enters the housing via the opening 14 and is chopped by the knives 26 rotating about the axis of the drive shaft 18. In order to obtain forage with different lengths as needed, the number of knives 26 and/or the feed velocity of the forage material and/or the rate of rotation of the disk wheel 20 can be changed. But since the feed velocity must be in a certain ratio to the driving velocity, and the rate of rotation of the disk wheel 20 is variable only within narrow limits (the minimum rate necessary to throw the forage out of the discharge chute 72 being close to the maximum rate permissible without injury to the forage material) the forage length should be determined as far as possible by the number of knives 26. If the forage material is to be cut relatively short, then all four knives 26 shown are left in their working positions. Each position is characterized in that the knife mounting 28 slants in the direction towards the front wall 12 and the locking pin 42 is caught in the recess 46 of the segment 52. The knives 26 cut the harvested material off at short intervals, and the cut material is thrown by several throwing blades 74, carried by brackets 76 on the disk wheel 20, through the outlet 72 of the cutter-blower.

If the material is to be cut into longer lengths, then the number of knives 26 in working positions is preferably reduced. For this purpose selected knives 26 are brought from their operative positions, shown in full lines, into the position represented by broken lines in FIG. 3. This is achieved very simply in that the knives 26 together with the mountings are manually foldable back into the rest position. The locking pin 42 can be withdrawn from their recesses 46 merely by pulling on pins 78 so that the mounting may be swung back to the position where the pins can snap into the recesses 68, where the knife mounting 28 is held securely.

It is a further advantage of this embodiment that the mountings function simultaneously as overload safety mechanisms. Thus, if a knife 26 should hit a hard object during operation, it can deflect individually, its locking pins 42 automatically camming out of the recesses 46, and thereafter either snapping into the recesses 68, or remaining in a position between the two recesses.

FIGS. 5 and 6 show another modification. In this form the knife mounting designated 128, is swingably mounted by means of pivots 130 in bearings 132 on supports 134. Holding arms 148 are provided with sleeves 180 that are swingably mounted on the pivots 130, and the upper portion of each arm is provided with two apertures 146, 168, each of which is adapted to receive one end of a spring-biased pin 142. As can best be seen from FIG. 5, two such pins 142 are mounted in alined apertures in holders 140 which are in turn mounted on the knife mounting means 128. Each of the locking means 148 is provided with an upstanding abutment 166 which is adapted to cooperate with an adjusting bolt 162 to hold the arm mounting means 128, and its knife, in the desired position.

The solidly drawn representation of the knife mounting means 128 in FIG. 6 indicates the working position. The pins 142 here are in the apertures 146 of the holding arms 148 and thereby hold the knife mounting means 128 firmly in this position. If the knife is to be swung into its inoperative position shown by the dotted lines, then the pins 142 must be retracted from the apertures 146 via handles 178, the knife mounting 128 folded back and the pins snapped into the apertures 168.

While I have shown and described above only two embodiments in which the principles of this invention have been incorporated, it is to be understood that my invention is not to be limited to the particular details, shown and described above, but that, in fact, widely different means may be employed in the practice of the broader aspects of my invention.

What I claim therefore, and desire to secure by Letters Patent is:

1. In a forage cutter of the class described, a rotor, a plurality of knives, knife mounting means carried by said rotor for each of said knives, means to secure one of said knives to one portion of each of said mounting means, said one portion being movable between an extended working position and a retracted inoperative position, and means to hold said one portion in either of said positions comprising locking means carried by said rotor and operatively associated with said knife mounting means, recess means in one of said mounting means and said locking means, and latch means in the other of said locking means and said mounting means, said latch means cooperating with said recess means to hold said knife in either of said positions.

2. The invention set forth in claim 1 in which said locking means is adjustable on said rotor whereby said knives can be adjustably disposed in either of their positions.

3. The invention set forth in claim 1 in which said latch means is a spring pressed detent and at least one of said recess means is provided with a cam surface.

4. In a forage cutter of the class described, a disk wheel, knife mounting means including a swingable part, means on the disk wheel to pivotally receive one end portion of said swingable part, a plurality of knives, each of said knives being mounted on the other end portion of said swingable part, spring biased means mounted on said swingable part and having an engaging portion extending outwardly therefrom, locking means associated with said disk wheel and having first and second recess means, the parts being so arranged and constructed that when the engaging portion of the spring biased means is disposed within the first recess means the knife is held in its extended working position, and when said engaging portion of the spring biased means is disposed within the second recess means the knife is held in its retracted inoperative position.

5. In a forage cutter of the class described, a housing having an opening therein through which forage material may be fed into the housing, a shear bar disposed adjacent said opening, a rotor mounted within said housing, a plurality of knives mounted on said rotor for swinging movement about an axis in a plane generally normal to the axis of the rotor and freely movable between an extended working position in which they are adapted to cooperate with said shear bar to cut material being fed into the housing and a retracted inoperative position, and means mounted on said rotor to lock said knives in either of said positions.

6. The invention set forth in claim 4 in which said spring biased means are mounted parallel to the knives.

7. In a forage cutter of the class described, a plurality of knives, a disk wheel provided with a plurality of pivot means, knife mounting means carried by said pivot means for each of said knives, means to secure one of said knives to a portion of said knife mounting means remote from said pivot means, said one portion being movable between an extended working position and a retracted inoperative position, detent means carried by said mounting means, and locking means carried by said disk wheel, said locking means being provided with recesses adapted to receive said detent means whereby said knife may be held in either its retracted inoperative position or in its extended working position.

8. The invention set forth in claim 7 in which said locking means comprises first bracket means mounted on said disk wheel, second bracket means mounted for limited sliding movement on said first bracket means, said recesses being disposed within said second bracket, and adjustable means adapted to cooperate with the second bracket to limit the sliding movement of the second bracket.

9. The invention set forth in claim 8 in which the second bracket is provided with stops outward of said recesses to limit the swinging movement of said mounting means.

10. The invention set forth in claim 7 in which said disk wheel is provided with recesses adapted to receive at least a part of said knife mounting means when said knife is held in its retracted inoperative position.

11. The invention set forth in claim 7 in which said locking means comprises an element swingably mounted on said pivot means, and adjustable means mounted on said disk wheel and adapted to hold said element in adjusted relationship to said disk wheel.

12. The invention set forth in claim 11 in which the detent means are substantially parallel to said knife.

References Cited by the Examiner
UNITED STATES PATENTS

| | | | |
|---|---|---|---|
| 2,064,689 | 12/36 | Russwurm et al. | 146—107 |
| 2,312,612 | 3/43 | Wetmore | 146—107 |
| 2,716,323 | 8/55 | Ford | 56—295 |

J. SPENCER OVERHOLSER, *Primary Examiner.*